Dec. 11, 1951  M. S. ZISKIN ET AL  2,577,990
FILTERING DEVICE FOR COFFEE MAKERS
Filed Jan. 17, 1948

INVENTORS.
MANUEL S. ZISKIN
LESTER W. CLINE
BY
William Isler
ATTORNEY.

Patented Dec. 11, 1951

2,577,990

UNITED STATES PATENT OFFICE 2,577,990

FILTERING DEVICE FOR COFFEE MAKERS

Manuel S. Ziskin, University Heights, and Lester W. Cline, Berea, Ohio, assignors to Kromex Corporation, Cleveland, Ohio, a corporation of Ohio Application January 17, 1948, Serial No. 2,893

1 Claim. (Cl. 210—162)

This invention relates generally to coffee brewing devices and more particularly to improved means for filtering the brew.

Our invention is particularly adapted to be used in conjunction with the type of coffee maker in which water is elevated under pressure from a water compartment into a brewing vessel which contains the coffee grounds. After the brew has been prepared, the pressure is permitted to subside and the brew flows back into the water compartment.

It is desirable that the brew be clear, that is, free from coffee grounds, and to attain this objective, various sorts of filters have been devised, including wire, cloth and paper mesh filters, to strain the brew as it returns to the water compartment.

It is a primary object of our invention to provide a filtering device which will efficiently strain the brew and keep it free of coffee grounds.

Another object of our invention is to provide a filtering device of the character described, which does not require periodic replacement, thereby avoiding the expense which is associated with the use of expendable types of filters.

Still another object of our invention is to provide a filtering device which will not clog during the performance of its function, and will, therefore, permit the relatively rapid return of the coffee brew to the water compartment.

A further object of our invention is to provide a filtering device which may be easily and quickly cleaned after use.

Other objects and advantages of our invention will become apparent during the course of the following description.

In the annexed drawings, forming a part of this specification, and in which like numerals are employed to designate like parts throughout the same, Fig. 1 is a cross-sectional view of a coffee maker embodying the filter which is the subject of our invention, the filter being shown in elevation.

Figure 1:
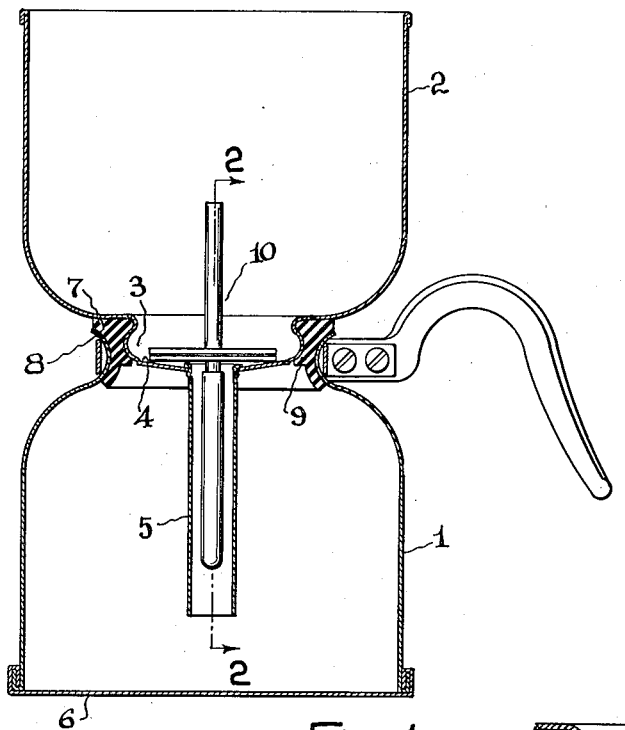
Figure 5:
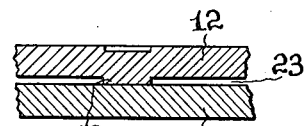
Fig. 5 is an enlarged sectional view taken on line 5—5 of Fig. 2.

Referring more particularly to the drawings, the numeral 1 designates the water compartment of a coffee brewing device, and the numeral 2 designates the upper or brewing vessel. The lower portion of the vessel 2 is cupped to form a central well 3 having a bottom wall 4 from which depends, centrally thereof, a tube 5, which extends into the water compartment 1 and terminates a slight distance above the bottom 6 of the compartment.

The compartment 1 has a central opening 7 which is defined by a necked portion 8 at the top of the compartment. The opening 7 is adapted to be sealed by a rubber gasket 9 which is mounted circumferentially on the exterior of the vessel 2.

In utilizing a coffee-making device of the type above mentioned, it is customary to fill the compartment 1 with water and to place in the vessel 2 the coffee grounds. As the end of the tube 5 is submerged in the water, the vapor pressure of the water will force the water to pass upwardly through the tube 5 and into the vessel 2, when the water is heated. The water will mix with the coffee grounds in the vessel 2 and form the brew, after which the coffee maker is removed from the heat and the brew flows back into the compartment 1.

It will be apparent that, in order to prevent the coffee grounds from being present in the brew when it is ready to be served, it is necessary that a straining or filtering device be interposed between the compartments 1 and the vessel 2 and for this purpose, we utilize our novel filter, designated generally by the numeral 10.

Figure 3:
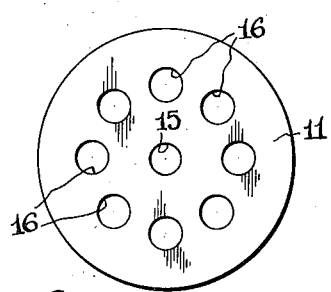
Fig. 3 is a top plan view of the sealing disc utilized in our invention.

The filter 10 comprises four parts, a sealing disc 11, a spacer disc 12, a stem 13 and a stabilizer rod 14. As best seen in Fig. 3, the sealing disc 11 is in the form of a flat circular disc provided with a central opening 15 and a plurality of circumferentially-spaced openings 16.

The spacer disc 12 is also a flat circular disc of the same size as the sealing disc 11 and it is provided with a centrally located opening 17. Surrounding the opening 17 is an annular embossment 18 and a series of circumferentially-spaced embossments 19, the embossments 18 and 19 forming projections on the surface of the disc 12, the purpose of which will be hereinafter described.

The discs 11 and 12 are adapted to be loosely mounted on the cylindrical stem stem 13 which terminates in an extension 20 of reduced diameter, thereby forming the shoulder 21. The diameter of the openings 15 and 17 is smaller than the diameter of the stem 13, although such that the discs 11 and 12 are readily slidable thereon.

The end of the extension 20 is tapered slightly in order to permit the extension to be wedged into a cavity 22 which is centrally located in one end of the stabilizer rod 14.

Figure 2:
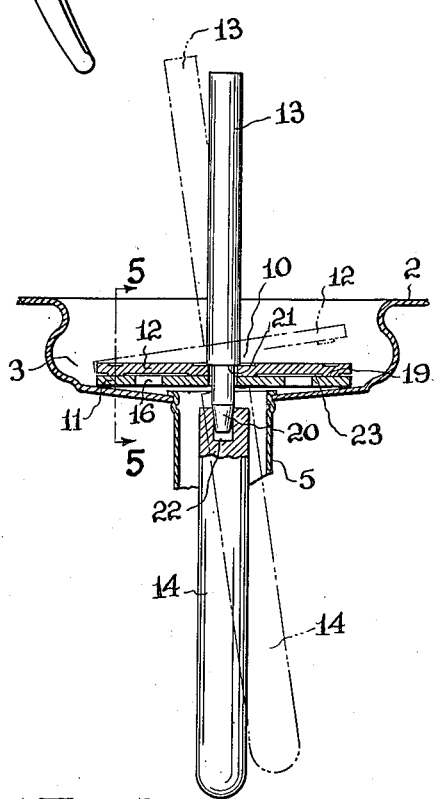
Fig. 2 is a fragmentary cross-sectional view taken on line 2—2 of Fig. 1.
Figure 4:
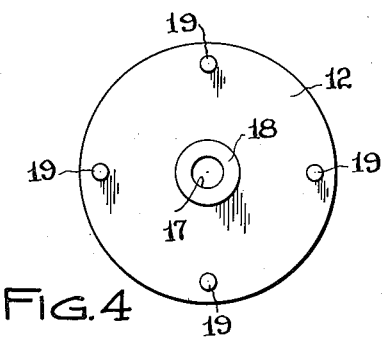
Fig. 4 is a bottom plan view of the spacer disc employed in our invention.

As seen in Fig. 2, the filter 10 is placed in the vessel 2 in such a manner that the stabilizer rod 14 extends downwardly within the tube 5 and the sealing disc 11 rests on the bottom 4 of the well 3. The spacer disc 12 rests on top of the sealing disc 11, being maintained in spaced relationship thereto, however, by the projecting embossments 18 and 19. The weight of the stabilizer 14 maintains the stem 13 in abutment against the spacer disc 12, the shoulder 21 acting to limit the downward movement of both the stabilizer 14 and the stem 13.

It will be noted that the spaced relationship of the discs 11 and 12 permits a passageway or gap 23 to be formed between the adjacent surfaces of the discs 11 and 12 and it is well to mention at this point that the distance between the two discs, which defines the gap 23, is critical and must be accurately maintained. In the embodiment shown, the embossments are so formed as to project not less than .006 inch and not more than .0075 inch, the gap thus defined being sufficiently narrow to prevent the passage therethrough of coffee grounds and yet being sufficiently wide to permit the relatively rapid flow therethrough of the liquid brew as it passes from the vessel 2 to the compartment 1.

The description of the operation of the coffee maker, previously given, may now be modified to include the functioning of the filter 10. When the filter 10 is in the position shown in Figs. 1 and 2, the abutment of the sealing disc 11 against the bottom of the well 3 prevents the dry coffee grounds from falling into the water compartment 1. When the heated water is elevated from the compartment 1 it passes readily through the opening 16 in the disc 11 and through the gap 23 between the discs 11 and 12, into the vessel 2. Water will continue to flow into the vessel 2 until the level of the water in the compartment 1 falls below the end of the tube 5. Continued heating of the water will cause steam to bubble up through the tube 5 and into the coffee mixture in the vessel 2, thereby agitating the mixture so that the full flavor may be extracted from the coffee grounds.

As the boiling increases in vigor, the steam generated will increase in volume thereby intermittently displacing the spacer disc 12, which is free to move relatively to the sealing disc 11. In order to prevent the steam pressure in the compartment 1 from becoming unduly great, the filter 10 must be sufficiently light in weight to be displaced at low steam pressures, and yet heavy enough to permit the steam pressure to build up to a point where vigorous agitation of the brew will be effected. In the embodiment of the present invention, the filter 10 has been found to function most satisfactory when its weight, exclusive of the sealing disc 11, is approximately 2½ ounces.

When the spacer disc 12 is displaced by the steam pressure as seen, somewhat exaggerated for purposes of clarity, in dotted outline in Fig. 2, the width of the gap 23 is considerably increased. However, the velocity and pressure of the escaping steam will prevent any counter-flow of coffee grounds into the gap 23.

After the coffee has been brewed for a sufficient length of time, the heating is discontinued. As the compartment 1 cools, the steam therein condenses creating a slight vacuum. The differential in pressure thus created between the compartment 1 and the vessel 2 causes the brew to flow back through the gap 23, the openings 16, and the tube 5, into the compartment 1, from which it may be served.

During this flow back of the brew, the leached coffee grounds are prevented from passing into the compartment 1 by the discs 11 and 12, the gap 23 being of such narrow width as to effectively obstruct their passage, while, at the same time, permitting a relatively rapid flow of the liquid.

In using the common type of cloth or paper mesh filter, the coffee grounds collect on the surface of the filter and form a thick layer of paste-like consistency which clogs the filter openings and obstructs the passage downwardly of the fluid through the filter. The formation of this barrier is in large part due to the fact that the filtering surfaces are disposed in substantially horizontal planes on which the coffee grounds would naturally settle. In contrast thereto, it will be manifest that the gap 23 of the filter 10 provides a channel which is disposed at right angles to the natural flow pattern of the liquid. The coffee grounds settle predominantly on the horizontal surface of the spacer disc 12, which surface plays no part in the filtering process. Thereby, the entrance to the gap 23, which is the filtering medium, is less likely to be obstructed or clogged by the coffee grounds, and the liquid flows rapidly into the lower compartment 1.

It will be noted that the filter 10 is readily removed from the vessel 2, it being maintained in position by its own weight only, as contrasted to other types of filters which are wedged into place or otherwise frictionally held. After it is removed, the filter 10 may be easily and quickly cleaned by rinsing with water, there being no disassembly of the parts required and no clogging of the mesh, as is customary in other types of filters.

It will be thus apparent that we have provided an efficient filtering device for coffee makers which requires no periodic replacement, which is not subject to the wear and tear of frictionally-held devices, which is easily cleaned after use, and which is so constructed as to minimize the clogging effect of the coffee grounds.

It is to be understood that the form of our invention herein shown and described is to be taken as a preferred example of the same and that various changes in the shape, size and arrangement of the parts may be resorted to without departing from the spirit of our invention or the scope of the subjoined claim.

Having thus described our invention, we claim:

A filtering device for a coffee maker of the type having an elevated brewing vessel opening into a lower receptacle, said filtering device comprising a flat thin metal disk having a plurality of openings therein, said disk being adapted to overlie the opening between said vessel and said receptacle, a second thin metal disk superimposed on said first-named disk in axial alignment therewith, projections formed on one of said disks and abutting the surface of the other of said disks to retain said disks in axially spaced relationship, said projections being disposed inwardly of the periphery of said disks but outwardly of the openings in the first disk whereby the conjoint edges of said disks define an uninterrupted horizontal annular flow channel, said channel being of such dimension as to restrain the passage therethrough of coffee grounds, a stem having a portion of reduced diameter extending through said disks and providing a shoulder which rests on the second disk, said reduced portion extending into said lower receptacle to maintain said disks in axial alignment, and a removable stabilizing rod of predetermined weight frictionally secured to said stem extension and extending freely into said lower receptacle to yieldably maintain said stem in vertical position, the axial distance between said stabilizing rod and said stem being greater than the thickness of said disks in combination.

MANUEL S. ZISKIN.
LESTER W. CLINE.

REFERENCES CITED

The following references are of record in the file of this patent:

UNITED STATES PATENTS

| Number | Name | Date |
|---|---|---|
| 1,926,557 | Perkins | Sept. 12, 1933 |
| 1,992,101 | Stuart | Feb. 19, 1935 |
| 2,027,826 | Keaton | Jan. 14, 1936 |
| 2,042,537 | Liddell | June 2, 1936 |
| 2,069,939 | Browning | Feb. 9, 1937 |
| 2,234,678 | Matson | Mar. 11, 1941 |
| 2,289,498 | Hons | July 14, 1942 |
| 2,386,433 | Carter et al. | Oct. 9, 1945 |
| 2,387,322 | Francis | Oct. 23, 1945 |
| 2,390,269 | Peterson | Dec. 4, 1945 |
| 2,495,996 | Wolcott | Jan. 31, 1950 |